April 22, 1958 M. K. CAHN 2,831,369
APPARATUS FOR ACHIEVING SYNCHRONIZED DYNAMIC BALANCE
Filed Feb. 15, 1957 2 Sheets-Sheet 1

INVENTOR,
MICHEL K. CAHN
ATTORNEY

April 22, 1958    M. K. CAHN    2,831,369
APPARATUS FOR ACHIEVING SYNCHRONIZED DYNAMIC BALANCE
Filed Feb. 15, 1957    2 Sheets-Sheet 2

INVENTOR,
MICHEL K. CAHN
BY
ATTORNEY

United States Patent Office 2,831,369
Patented Apr. 22, 1958

2,831,369

APPARATUS FOR ACHIEVING SYNCHRONIZED DYNAMIC BALANCE

Michel Kurt Cahn, New Orleans, La.

Application February 15, 1957, Serial No. 640,440

12 Claims. (Cl. 74—573)

This invention relates to rotary equipment, and more particularly to a balance mechanism for rotary equipment.

This invention is an improvement over the balance bearing shown and described in my prior application Serial No. 384,931, filed October 8, 1953.

The object of the invention is to provide a synchronized dynamic balance mechanism which will permit accurate balancing of a rotary body during all phases of rotation.

Another object of the invention is to provide a synchronized dynamic balance bearing assembly for use with rotary equipment in which accurate balance is required wherein such rotary equipment may be washing machines, extractors or the like, the present invention insuring that the desired balance will be maintained even during acceleration and deceleration of the rotating body.

Another object of the invention is to provide a balance bearing which includes concentrically arranged members which have a flexible or elastic receiver positioned therebetween, the receiver being provided with a quantity of fluid or liquid, and wherein the receiver includes portions thereof which define pressure pockets which are positioned or interposed between adjacent sections of the members.

A still further object of the invention is to provide a balance bearing assembly which includes members that have a flexible receiver positioned therebetween, the flexible receiver holding a quantity of fluid or liquid, and wherein the receiver is provided with pressure pockets and partitions, the partitions being provided with openings or apertures so that the fluid can flow through these openings so as to equalize the pressure in the necessary manner to insure that the mechanism remains in a balanced condition during all phases of rotation.

A still further object of the invention is to provide a balance mechanism which includes at least two members which are arranged in concentric relation with respect to each other, and wherein means is provided for permitting the inner member to move off center, as for example when a load is placed in the inner member so that a load in the inner member will be properly balanced by fluid in an elastic receiver so that vibrations or the like will be minimized or prevented.

A still further object of the invention is to provide a balance bearing for a rotating body which is extremely simple and inexpensive to manufacture.

Other objects and advantages will be apparent during the course of the following description.

In the accompanying drawings, forming a part of this application, and in which like numerals are used to designate like parts throughout the same:

Figure 1:
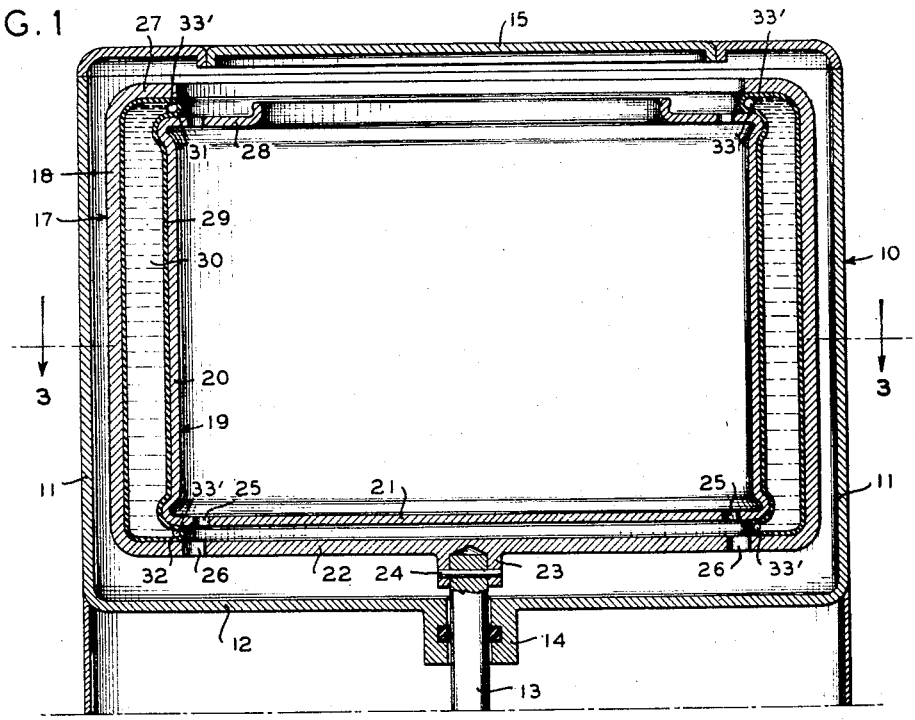
Fig. 1 is a vertical sectional view taken through a machine equipped with the balance bearing of the present invention.
Figure 2:
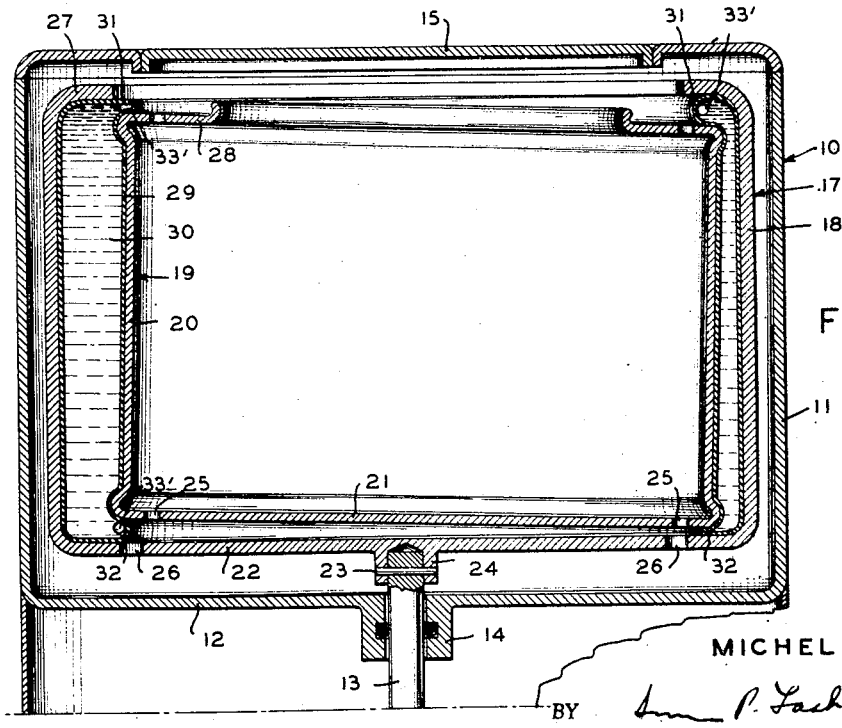
Fig. 2 is a view similar to Fig. 1 but showing the position of the parts when the fluid has been moved to a position in opposition to a load in the inner rotating body.
Figure 3:
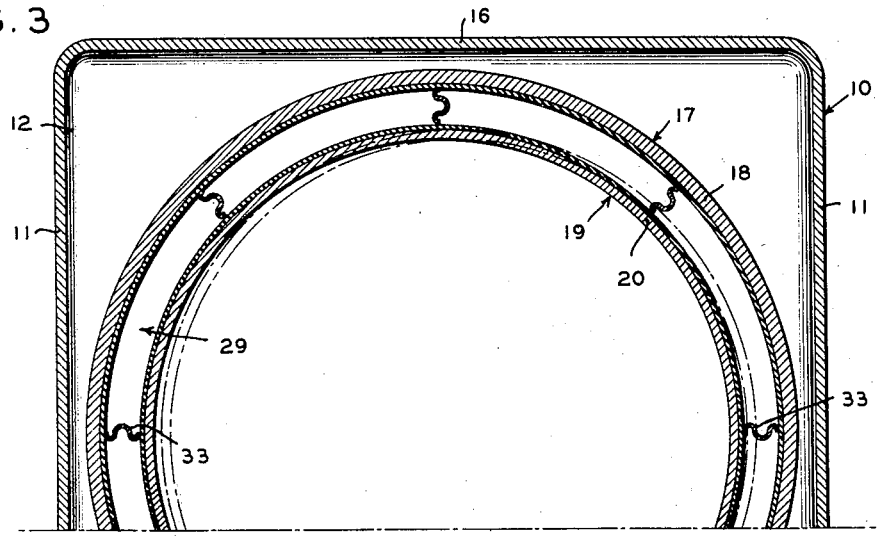
Fig. 3 is a sectional view taken on the line 3—3 of Fig. 1.

Referring in detail to the drawings, and more particularly to Figs. 1, 2 and 3 of the drawings, there is shown an assembly which includes an outer housing 10 which is stationary, and the housing 10 includes side walls 11, and a bottom wall 12, and a top wall or cover 15 is provided for the housing 10. Depending from the bottom wall 12 of the housing 10 is a collar 14, there being a shaft 13 extending through the collar 14, and whereby the shaft 13 may be connected to any suitable power source. The housing 10 further includes a back wall 16, Fig. 3.

Positioned within the housing 10 is movable container 17, and the container 17 includes a curved side wall 18, Fig. 3. Positioned within the container 17 is a movable casing 19, and the casing 19 embodies a curved side wall 20 which is arranged in concentric relation within the side wall 18. The casing 19 further includes a horizontally disposed bottom wall 21 which is arranged above the bottom wall 22 of the container 17. Depending from the bottom wall 22 of the container 17 is a flange or collar 23 which receives the upper end of the shaft 13, there being a pin 24 connecting the collar 23 to the shaft 13.

The bottom wall 21 and the bottom wall 22 are provided with drainage openings 25 and 26, so that water or the like can readily drain through these openings as for example when clothes are being spun dry.

The inner casing 19 includes a top portion 28 which is arranged below the top portion 27 of the container 17, Figs. 1 and 2. Interposed between the casing 19 and the container 17 is a flexible elastic receiver which is indicated generally by the numeral 29, and the receiver 29 is adapted to hold a quantity of fluid or liquid 30 therein. Upper and lower end portions of the receiver 29 extend transversely to define pressure pockets 31 and 32, and the receiver 29 is further provided with a plurality of spaced apart partitions 33. The partitions 33 are provided with openings or apertures 33', as shown in the drawings.

While certain structure has been described and illustrated, it is to be understood that this structure is not disclosed or illustrated in a limiting sense and that the principle of the invention is applicable to structures other than that illustrated and described herein.

Figure 4:
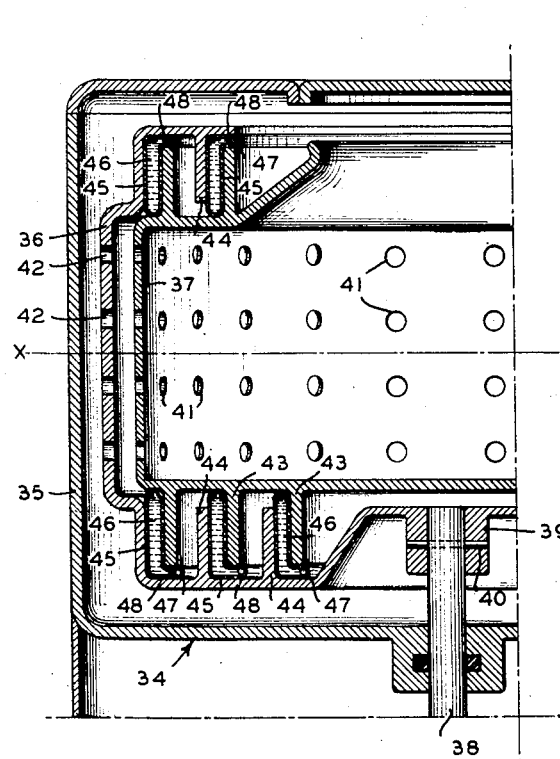
Fig. 4 is a fragmentary sectional view illustrating a modified construction.

Referring now to Fig. 4 of the drawings, there is shown a modified assembly which is indicated generally by the numeral 34, and the assembly 34 includes an outer stationary housing 35, there being a container 36 positioned within the housing 35. A casing 37 is arranged in concentric relation with respect to the container 36. Extending through the bottom of the housing 35 is a shaft 38 which is adapted to be connected to a suitable power source, and the upper end of the shaft 38 is connected to a collar 39 on the lower end of the container 36 through the medium of a suitable securing element such as a pin 40.

Drainage openings 41 and 42 are provided in the casing 37 and container 36 for the egress therethrough of water.

Extending from the ends of the inner casing 37 is a plurality of spaced apart flanges or wall portions 43 which are adapted to coact with flanges or wall portions 44 in the container 36, and positioned between these coacting wall portions 43 and 44 are fluid holding receivers 45 which are made of suitable elastic material such as a rubber like material.

Fluid 46 is positioned within the receivers 45, and each of the receivers 45 includes a transversely extending end portion 47 which defines a pressure pocket. The receivers 45 are provided with partitions which are similar to the previously described partitions 33, and the partitions have openings or apertures 48 therein, Fig. 4.

From the foregoing, it is apparent that there has been provided a balance bearing mechanism which is an improvement over the balance bearing mechanism shown and described in my copending application. As shown in Figs. 1, 2 and 3, there is provided an assembly which may form part of a washing machine, or clothes drying machine, wherein the inner casing or basket 19 is adapted to hold the clothing or other articles which are being washed or spun dry.

The shaft 13 is adapted to be connected to any suitable power source and this rotation of the shaft 13 causes rotation of the container 17 as well as rotation of the inner casing 19. In Fig. 1 the parts are shown in balanced or neutral position, while in Fig. 2 there is illustrated the position where the fluid 30 is moved towards one portion of the assembly as when a load in the rotating casing 19 causes the casing 19 to move to the off center position.

The pressure pockets 31 and 32 are positioned between the adjacent end portions of the casing 19 and container 17 and due to the provision of the receiver 29 having the fluid 30 therein, it will be seen that when a load such as a load of clothing, causes the casing 19 to move to an off center position, as for example as shown in Fig. 2, the fluid will be moved to a position in opposition to the load in the casing 19 so that this fluid will offset the weight of the load whereby the assembly will be maintained in balanced position so that the parts will function properly.

The pressure pockets 31 and 32 prevent the inner casing 19 from contacting the intermediate container 17.

In the modified assembly shown in Fig. 4, the same general principle is utilized as previously described, except that a plurality of fluid receivers 45 are provided, and these receivers 45 have liquid or fluid 46 therein. The receivers 45 are positioned between coacting wall portions of the casing 19 and container 36, and each receiver 45 includes a pressure pocket 47, and due to the provision of the plurality of receivers 45, it will be seen that with a load in the inner casing 37 that when the load moves to an off center position, the fluid will move to an opposed position which is opposite to the load so that the apparatus will be maintained in a proper balanced position.

The container 36 and casing 37 are adapted to be driven by the shaft 38.

The present invention is especially suitable for use with rotary equipment wherein accurate balance is required or desired, as for example in washing machine extractors. Heretofore, fluid has been used for providing balancing arrangements after acceleration or after all of the rotating parts, including the balanced liquid, have the same rotary speed. However, with prior equipment it was not possible to maintain a balanced system during acceleration and deceleration, but with the present invention a complete balance is maintained during all phases of rotation. For example, with the parts shown in the position of Fig. 2, an unbalanced load is neutralized by the fluid.

The partitions, such as the partitions 33, extend through the entire length of the receiver 29 and these partitions are provided with openings or holes 33' which are located in the vicinity of the pressure pockets. The liquid 30 is under pressure in the receiver 29 so that the pressure pockets 31 and 32 are expanded and since the receivers and pressure pockets are made of elastic material, the pressure will remain effective. This pressure of the fluid provides the necessary frictional contact for synchronized rotation between the container 17, the receiver 29 and casing 19.

The partitions 33 help to transmit the rotational movement and force the liquid 30 to rotate equally therewith so that in each phase of rotation, all rotatable parts as well as the liquid 30 keeps the same relative rotational movement, even during acceleration and deceleration.

Figure 5:
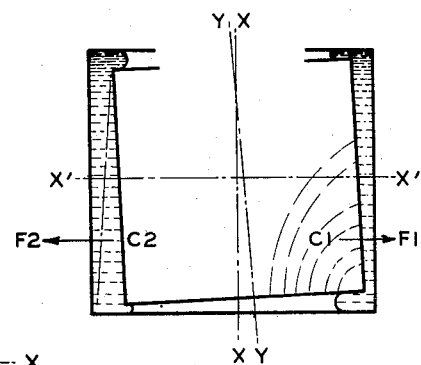
Fig. 5 is a schematic view illustrating diagrammatically the principle of the present invention.

The pressure pockets 31 and 32, or the pressure pockets 47 act like elastic buffers on both ends of the casing 19 so as to permit the casing 19 to assume an inclined position with respect to the vertical axis as shown in Fig. 2 and in Fig. 5. Thus, the casing 19 can move in the necessary direction similar to a free floating body on water. When the casing has an off balance load, not exceeding the counterbalance capacity of the structure and when the casing is rotating so that it is synchronized with the previously described parts, the casing will immediately assume a complete balanced position inside the receiver 29.

The liquid 30 in the receiver 29 will flow through the openings 33' to the respective counterbalanced position without interfering with the synchronized rotation of the liquid in the main section between the wall 18 of the container and the wall 20 of the casing. The capacity of the balanced bearing for synchronized rotation may be calculated by a formula or equation which is described in detail in my copending application Serial No. 384,931.

In the arrangement shown in Fig. 4, the receivers 45 are provided with partitions and these partitions have perforations or openings 48 therein which function in the same manner as the previously described openings 33'. It is to be noted that in Fig. 4, there are more receivers 45 in the lower portion of the assembly than there are in the upper portion of the assembly and this has an important advantage as hereinafter explained. Thus, since the off balance load has its gravity center usually below the middle line or plane X'—X' of the casing 37, the lower balance units should have more total balance capacity than the upper balance units together.

In Fig. 4, the assembly can assume an inclined position with respect to the vertical axis, as is the case with the first described assembly.

Figure 6:
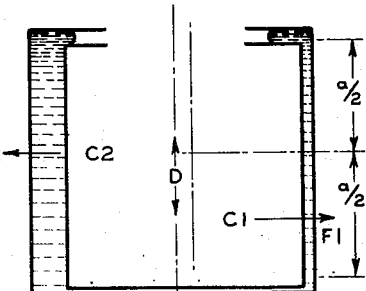
Fig. 6 is a view similar to Fig. 5, but illustrating existing types of balance assemblies.

In Fig. 5 there is shown or illustrated schematically the advantages of the present invention over the previous equipment which is illustrated in Fig. 6. Thus, besides providing the lower portion of the assembly with greater counterbalance capacity than the upper portion, it is seen that the casing 19 or casing 37 can assume an inclined position with respect to the vertical axis, as well as the usual radial or lateral shifting.

In the view illustrated in Fig. 5, the gravity center of the off balance load is in C1, and its centrifugal effect F1 is below the middle line X'—X'. The inclined position of the casing, together with the usual radial shifting, has a counter effect so that the gravity center C2 of the counterbalancing liquid is also below the middle line X'—X' and exactly on the same level as C1, and the centrifugal force F1 is counterbalanced through centrifugal forces F2 on the same level.

With previous equipment or arrangements as shown in Fig. 6, the inner casing shifts in a radial direction only so that the gravity center C2 of the counterbalancing liquid is always on the middle line so that the counterbalancing centrifugal forces F2 and F1 are on different levels with the distance D remaining in said structure so that a twisting force results in an apparatus which does not permit the inner casing to incline.

The expressions $a/2$ shown in Fig. 6 indicate the medial or middle line of the assembly.

Thus, it will be seen that there has been provided a dynamical synchronized balanced device which includes a hollow container as well as a means for supporting and rotating this container, and movably mounted in the container is a hollow casing. A receiver is positioned between the container and the casing, and this receiver is made of a flexible elastic material. The receiver is provided with a pair of perforated partitions which are symmetrically located and the receiver is filled with liquid and the liquid under pressure causes contact between the container and the receiver and between the receiver and the casing so as to insure or force synchronism during rotation. Furthermore, the device includes the receiver which has the pressure pockets extending towards the axis of rotation and these pressure pockets are positioned between the adjacent end portions of the container and casing so as to permit the casing to shift in every direction inside the receiver. The liquid expands the pressure pockets and the expanded pressure pockets keep counter pressure on the liquid. The perforations in the partitions are arranged in the pressure pockets so that the partitions will shut off the flow of liquid in the major portion of the receiver so that synchronized rotation of the liquid is forced by the partitions during all phases of rotation.

Furthermore, the perforated partitions are evenly spaced within the receiver. In Fig. 4, the coacting or cooperating flanges define spaces therebetween for receiving the elastic receivers and these receivers in Fig. 4 are also provided with partitions which have openings inside the pressure pockets, and each receiver has a pressure pocket on an end thereof.

The principle of the present invention is especially suitable for use with a centrifugal type of clothes dryer but it is to be understood that the principle is applicable to other types of apparatus.

As illustrated in Fig. 6, previous equipment has been arranged so that the axes of the inner and outer containers or baskets remain parallel and in contrast with this, as shown in Fig. 5, the present invention permits the inner casing to move to an inclined self-adjusted position so as to compensate for the eccentricity of irregularly placed loads and this is compensated for automatically by permitting the inner basket to move away from the original axis X—X to its newly established axis Y—Y so as to establish a new and flexible center of gravity for each irregularly placed load. The pressure pockets facilitate this movement. The liquid which is used may be water, and the partitions define separate cells or compartments and these partitions have orifices or openings so that the water can flow into one cell or compartment from another compartment so as to automatically counterbalance the eccentrically placed clothes, but the openings are arranged so that the water cannot circulate when variations of the assembly might have a tendency to cause the water in the receiver to flow circumferentially as would be the case if the baffles or partitions were not used.

The water or other liquid is moved from one compartment to the other, not by inertia, but by the eccentricity of the inner casing caused by the irregularly placed clothes, as well as the arrangement which permits the inner casing to tilt off of its primary axis X—X, onto its new axis Y—Y.

The principle of the present invention is especially suitable for use in washing machine extractors, but it is equally suitable for other types of apparatus, and as previously described a complete balance will be achieved during all phases of rotation. The quantity of liquid is such that the receiver is under pressure and the pressure pockets are produced and these pressure pockets extend inwardly toward the center of the apparatus so that the pressure will be exerted on the walls of both the casing and container, whereby synchronous rotation of the casing and container will be brought about.

The various drainage openings can be used for the drainage of laundry water. The openings in the partitions permit the liquid to be displaced in counterbalanced position and these openings are placed symmetrically so that an off balance effect does not occur, and the number of partitions can be varied as desired, but these partitions are spaced apart equally.

Since the liquid in the receiver is under steady pressure, there will be no slippage between the rotating parts and this will insure synchronous rotation of the container with the basket or casing and receiver. This also produces the pressure pockets, which in counter effect, maintain the necessary pressure on the liquid and these pressure pockets also permit the additional shifting movement of the inner casing, angular to the axis X—X illustrated in Fig. 5, whereby off balance forces are counterbalanced as previously described. Thus, as previously described, without this angular shiftability, the gravity center of the counterbalance forces would not be on the same level so that complete dynamical counterbalance could not be achieved.

The partitions force the liquid to rotate synchronously in each phase of rotation so that dynamical balance is achieved in each phase of rotation.

The principle of the present invention can be utilized in conventional washer extractor mechanisms without altering the basic function or shape of these devices.

The provision of the plurality of perforated diaphragms slowly permits the fluid in the intermediate space to adjust itself to varying conditions in connection with the movement between the inner and outer baskets, and the diaphragms or partitions are made from a suitable flexible material.

I claim:

1. A dynamical synchronized balance comprising a hollow container, means for supporting and rotating said container, a hollow casing movably mounted in said container, a receiver interposed between said container and said casing, said receiver being made of flexible elastic material, said receiver being provided with a plurality of partitions having perforations therein, said partitions being symmetrically located, said receiver being filled with liquid under pressure, said liquid under pressure causing compression contact between said container and receiver and between said receiver and the casing to force synchronism during rotation.

2. The structure as defined in claim 1 wherein said receiver is provided with pressure pockets extending toward the axis of rotation, said pressure pockets being interposed between the adjacent end portions of the container and the casing so that the casing has shiftability in every direction inside the receiver.

3. A dynamical synchronized balance comprising a hollow container, means for supporting and rotating said container, a hollow casing movably mounted in said container, a receiver interposed between said container and said casing, said receiver being made of flexible elastic material, said receiver being provided with a plurality of partitions having perforations therein, said partitions being symmetrically located, said receiver being filled with liquid under pressure, said liquid under pressure causing compression contact between said container and receiver and between said receiver and the casing to force synchronism during rotation, said receiver being provided with pressure pockets extending toward the axis of rotation, said pressure pockets being interposed between the adjacent portions of the container and casing, so that the casing has shiftability in every direction inside the receiver, said pressure pockets being expanded by the pressure of the liquid, said pressure pockets being elastic and said expanded pressure pockets keeping counter pressure on the liquid.

4. The structure as defined in claim 3 wherein the perforations of the partitions are located in the pressure pockets, said partitions serving to shut off the flow of liquid in the major portion of the receiver so that synchronized rotation of the liquid is forced by the partitions during all phases of rotation.

5. A dynamical synchronized balance comprising a hollow container, means for supporting and rotating said container, a hollow casing movably mounted in said container, a receiver interposed between said container and said casing, said receiver being made of flexible elastic material, said receiver being provided with a plurality of partitions having perforations therein, said partitions being symmetrically located, said receiver being filled with liquid under pressure, said liquid, under pressure causing compression contact between said container and receiver and between said receiver and the casing to force synchronism during rotation, said receiver being provided with pressure pockets extending toward the axis of rotation, said pressure pockets being interposed between the adjacent portions of the container and casing, so that the casing has shiftability in every direction inside the receiver, said pressure pockets being expanded by the pressure of the liquid, said pressure pockets being elastic and said expanded pressure pockets keeping counter pressure on the liquid, the perforations of said partitions being located in the pressure pockets, said partitions serving to shut off the flow of liquid in the major portion of the receiver, so that synchronized rotation of the liquid is forced by the partitions during all phases of rotation, said perforated partitions being evenly spaced in the receiver.

6. In a dynamical balance device, a hollow rotatably mounted container, means for supporting and rotating said container, a hollow casing movably mounted in said container, a plurality of spaced apart flanges extending outwardly from each end of said casing, a plurality of spaced apart flanges extending inwardly from each end of said container, the flanges on said casing coacting with the flanges on said container to define spaces therebetween, a flexible elastic receiver seated in each space, end portions of each receiver providing pressure pockets, and partitions arranged in said receivers and said partitions having perforations therein located in said pressure pockets.

7. In a dynamical synchronized balance mechanism, an outer stationary housing, a rotary container positioned within said housing, means for rotating said container, a movable casing positioned within said container, an elastic receiver interposed between said container and casing having a quantity of fluid therein, a plurality of spaced apart partitions positioned within said receiver and said partitions having openings therein, end portions of said receiver extending inwardly to define pressure pockets, the openings in said partitions being arranged in said pressure pockets.

8. In a dynamical synchronized balance mechanism, an outer stationary housing, a rotary container positioned within said housing, means for rotating said container, a movable casing positioned within said container, an elastic receiver interposed between said container and casing and having a quantity of fluid therein, a plurality of spaced apart partitions positioned within said receiver and said partitions having openings therein, end portions of said receiver extending transversely inwardly to define pressure pockets, the openings in said partitions being arranged in said pressure pockets, said partitions being evenly spaced in said receiver.

9. In a dynamical synchronized balance mechanism, an outer stationary housing, a rotary container positioned within said housing, means for rotating said container, a movable casing positioned within said container, an elastic receiver interposed between said container and casing and having a quantity of fluid therein, a plurality of spaced apart partitions positioned within said receiver and said partitions having openings therein, end portions of said receiver extending transversely inwardly to define pressure pockets, the openings in said partitions being arranged in said pressure pockets, said partitions being evenly spaced in said receiver, said partitions shutting off the flow of fluid in the major portion of the receiver whereby synchronized rotation of the fluid is forced by the partitions during all phases of rotation.

10. In a dynamical synchronized balance mechanism, an outer stationary housing, a container arranged within said housing, power means for rotating said container, a casing positioned within said container, a plurality of coacting flanges extending from the container and casing, said flanges defining spaces therebetween, elastic receivers positioned in said spaces and having fluid under pressure therein, end portions of said receivers extending transversely inwardly to define pressure pockets, and partitions positioned in said receivers and having openings therein, said openings being positioned in said pressure pockets.

11. In a dynamical synchronized balance mechanism, an outer stationary housing, a container arranged within said housing, power means for rotating said container, a casing positioned within said container, a plurality of coacting flanges extending from the container and casing, said flanges defining spaces therebetween, elastic receivers positioned in said spaces and having fluid under pressure therein, end portions of said receivers extending transversely inwardly to define pressure pockets, and partitions positioned in said receivers and having openings therein, said openings being positioned in said pressure pockets, there being more of the receivers in the lower portion of the mechanism than there are in the upper portion of the mechanism.

12. A dynamical synchronized balance comprising a hollow container, means for supporting and rotating said container, a hollow casing movably mounted in said container, a receiver interposed between said container and said casing, said receiver being made of flexible elastic material, partition means arranged in said receiver, said receiver being filled with liquid under pressure, said liquid under pressure causing compression contact between said container and receiver and between said receiver and the casing to force synchronism during rotation.

References Cited in the file of this patent
FOREIGN PATENTS
732,706    Great Britain _____ June 29, 1955